(12) United States Patent  
Fricke et al.

(10) Patent No.: US 10,614,613 B2  
(45) Date of Patent: Apr. 7, 2020

(54) REDUCING NOISE DURING RENDERING BY PERFORMING PARALLEL PATH SPACE FILTERING UTILIZING HASHING

(71) Applicant: NVIDIA Corporation, Santa Clara, CA (US)

(72) Inventors: Sascha Fricke, Braunschweig (DE); Nikolaus Binder, Berlin (DE); Alexander Keller, Berlin (DE)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/045,627

(22) Filed: Jul. 25, 2018

(65) Prior Publication Data

US 2019/0035140 A1 Jan. 31, 2019

Related U.S. Application Data

(60) Provisional application No. 62/538,384, filed on Jul. 28, 2017.

(51) Int. Cl.
| | |
|---|---|
| *G06T 15/00* | (2011.01) |
| *G06T 15/06* | (2011.01) |
| *G06T 5/00* | (2006.01) |
| *G06T 1/20* | (2006.01) |
| *G06T 15/50* | (2011.01) |

(52) U.S. Cl.
CPC .............. *G06T 15/06* (2013.01); *G06T 1/20* (2013.01); *G06T 5/002* (2013.01); *G06T 15/506* (2013.01)

(58) Field of Classification Search
CPC ......... G06T 15/06; G06T 15/506; G06T 1/20; G06T 5/002

USPC ........................................................ 345/419
See application file for complete search history.

(56) References Cited

U.S. PATENT DOCUMENTS

| | | | |
|---|---|---|---|
| 8,271,986 | B2 | 9/2012 | Jiang et al. |
| 8,355,022 | B2 | 1/2013 | Hoffman et al. |
| 9,189,883 | B1 | 11/2015 | Hecht |
| 9,237,263 | B2 | 1/2016 | Rime et al. |
| 9,633,468 | B2 | 4/2017 | Peterson et al. |

(Continued)

FOREIGN PATENT DOCUMENTS

EP 2904605 A1 8/2015

OTHER PUBLICATIONS

Binder N, Fricke S, Keller A. Massively Parallel Path Space Filtering. arXiv preprint arXiv:1902.05942. Feb. 15, 2019.*

(Continued)

*Primary Examiner* — Phu K Nguyen  
(74) *Attorney, Agent, or Firm* — Zilka-Kotab, PC

(57) ABSTRACT

A method, computer readable medium, and system are disclosed for reducing noise during a rendering of a scene by sharing information that is spatially close through path space filtering. A vertex of a light transport path is selected, and one or more features of the selected vertex are quantized. A first hash is calculated based on the one or more quantized features of the selected vertex, and a collision resolution is performed within a hash table. A contribution of the light transport path at the selected vertex is accumulated to the hash table, and a counter is incremented in response to adding the contribution of the light transport path at the selected vertex to the hash table. An average contribution of the light transport path is then calculated, utilizing the counter.

23 Claims, 14 Drawing Sheets

(56) References Cited

U.S. PATENT DOCUMENTS 9,665,974 B2 5/2017 Jarosz et al.
9,953,457 B2 4/2018 Keller et al.
9,996,966 B2 6/2018 Lee et al.

OTHER PUBLICATIONS

Fleisz M. Photon Mapping on the GPU. Master's thesis, School of Informatics, University of Edinburgh. 2009.*
Gupte S. Real-Time Photon Mapping on GPU. University of Maryland Baltimore County. 2011.*
Reis NT, Costa VS, Pereira JM. Coherent Ray-Space Hierarchy Via Ray Hashing and Sorting. InVISIGRAPP (1: GRAPP) Feb. 2017 (pp. 195-202).*
Binder N, Fricke S, Keller A. Fast path space filtering by jittered spatial hashing, InACM SIGGRAPH 2018 Talks Aug. 12, 2018 (p. 71). ACM.*
Elek et al., "Real-Time Screen-Space Scattering in Homogeneous Environments," IEEE Computer Graphics and Applications, May 2013, pp. 1-11.
Teschner et al., "Optimized Spatial Hashing for Collision Detection of Deformable Objects," Computer Graphics Laboratory, VMV, Nov. 19-21, 2003, pp. 1-8.
Hachisuka et al., "Parallel Progressive Photon Mapping on GPUs," ACM SIGGRAPH Asia, 2010, 1 page.
Bako et al., "Kernel-Predicting Convolutional Networks for Denoising Monte Carlo Renderings," ACM Transactions on Graphics, vol. 36, No. 4, Article 97, Jul. 2017, pp. 97:1-97:14.
Chaitanya et al., "Interactive Reconstruction of Monte Carlo Image Sequences using a Recurrent Denoising Autoencoder," ACM Transactions on Graphics, vol. 36, No. 4, Article 98, Jul. 2017, pp. 98:1-98:12.
Dahm et al., "Learning Light Transport the Reinforced Way," preprint for Monte Carlo and Quasi-Monte Carlo Methods, 2016, 1-15, retrieved from https://arxiv.org/pdf/1701.07403.pdf.
Gautron et al., "Path Space Similarity determined by Fourier Histogram Descriptors," ACM SIGGRAPH Talks, 2014, 2 pages.
Hiachisuka et al., "Stochastic Progressive Photon Mapping," ACM Transactions on Graphics, vol. 28, No. 5, Article 141, Dec. 2009, pp. 141:1-141:8.
NVIDIA, "Amazon Lumberyard Bistro," Open Research Content Archive (ORCA), 2017, 5 pages, retrieved from https://developer.nvidia.com/orca/amazon-lumberyard-bistro.
Munkberg et al., "Texture Space Caching and Reconstruction for Ray Tracing," Preprint for ACM TOG, vol. 35, No. 6, 2016, 13 pages.
Schied et al., "Spatiotemporal Variance-Guided Filtering: Real-Time Reconstruction for Path-Traced Global Illumination," Proceedings of High Performance Graphics (HPG'17), Jul. 2017, 12 pages.
Zwicker et al., "Recent Advances in Adaptive Sampling and Reconstruction for Monte Carlo Rendering," Eurographics, 2015, 15 pages.
Jensen, H., "Realistic Image Synthesis Using Photon Mapping," AK Peters, 2001, 195 pages.
Sen et al., "Denoising your Monte Carlo Renders: Recent Advances in Image-Space Adaptive Sampling and Reconstruction," SIGGRAPH 2015 Courses, Aug. 9-13, 2015, 255 pages.
Keller et al., "Path Space Filtering," Monte Carlo and Quasi-Monte Carlo Methods, 2014, pp. 1-12.
Mara et al., "An Efficient Denoising Algorithm for Global Illumination," Proceedings of High Performance Graphics, Jul. 2017, 7 pages.
Ernst et al., "Filter Importance Sampling," IEEE Symposium on Interactive Ray Tracing, Sep. 2006, pp. 125-132.

* cited by examiner

REDUCING NOISE DURING RENDERING BY PERFORMING PARALLEL PATH SPACE FILTERING UTILIZING HASHING

CLAIM OF PRIORITY

This application claims the benefit of U.S. Provisional Application No. 62/538,384 titled "Parallel Path Space Filtering By Hashing," filed Jul. 28, 2017, the entire contents of which is incorporated herein by reference.

FIELD OF THE INVENTION

The present invention relates to ray tracing, and more particularly to performing path space filtering utilizing hashing.

BACKGROUND

Restricting path tracing to a small number of paths per pixel for performance reasons rarely achieves a satisfactory image quality for scenes of interest. However, path space filtering may dramatically improve the visual quality by sharing information across vertices of paths classified as proximate. However, current techniques for searching for proximate vertices in order to implement path space filtering are time-consuming and resource intensive. There is therefore a need for addressing these issues and/or other issues associated with the prior art.

SUMMARY

A method, computer readable medium, and system are disclosed for reducing noise during a rendering of a scene by sharing information that is spatially close through path space filtering. A vertex of a light transport path is selected, and one or more features of the selected vertex are quantized. A first hash is calculated based on the one or more quantized features of the selected vertex, and a collision resolution is performed within a hash table. A contribution of the light transport path at the selected vertex is accumulated to the hash table, and a counter is incremented in response to adding the contribution of the light transport path at the selected vertex to the hash table. An average contribution of the light transport path is then calculated, utilizing the counter.

DETAILED DESCRIPTION

Figure 1:
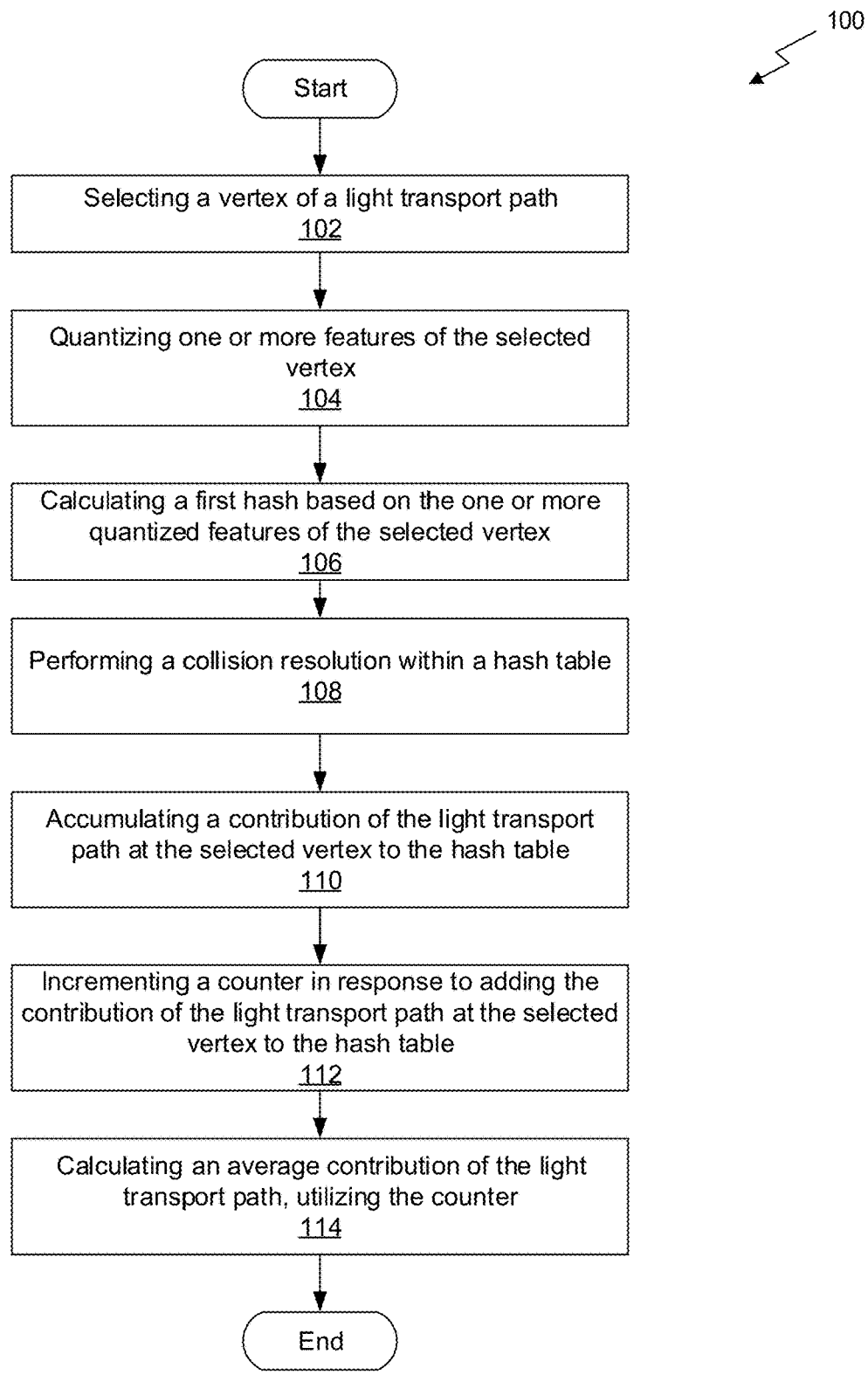
FIG. 1 illustrates a flowchart of a method for performing parallel path space filtering by hashing, in accordance with an embodiment.

FIG. 1 illustrates a flowchart of a method 100 for performing parallel path space filtering by hashing, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of performing parallel path space filtering by hashing. Furthermore, persons of ordinary skill in the art will understand that any system that performs method 100 is within the scope and spirit of embodiments of the present invention.

As shown in operation 102, a vertex of a light transport path is selected. In an embodiment, the light transport path may be generated by a path tracer. In another embodiment, the light transport path may be one of a plurality of light transport paths. In yet another embodiment, the vertex may be at an intersection between the light transport path and an object (e.g., an instance of geometry, etc.) within a scene.

Additionally, in an embodiment, the vertex may be one of a plurality of vertices for the light transport path within the scene. In another embodiment, the light transport path may start at an eye/camera location and may end at a light source.

Further, as shown in operation 104, one or more features of the selected vertex are quantized. For example, world space coordinates of the selected vertex may be scaled and their fractional part may be omitted. In an embodiment, the one or more features may include a position of the selected vertex within the scene. For example, the one or more features may include a world space position of the selected vertex. In another embodiment, constructing a key for the selected vertex may include quantizing one or more features of the selected vertex.

Further still, as shown in operation 106, a first hash is calculated based on the one or more quantized features of the selected vertex. In an embodiment, calculating the first hash may include applying a hash function to the key constructed for the selected vertex. In another embodiment, the results of the first hash may include a position in a hash table (e.g., a hash table index).

In addition, as shown in operation 108, collision resolution is performed within the hash table. In this way, an accumulation of contributions of vertices with different quantized features may be avoided.

Also, as shown in operation 110, a contribution of the light transport path at the selected vertex is accumulated to a hash table. In an embodiment, the contribution may include a color value transmitted to the vertex from a light source. In another embodiment, the contribution may be added to a position in the hash table calculated using the first hash.

Furthermore, as shown in operation 112, a counter is incremented in response to adding the contribution of the light transport path at the selected vertex to the hash table. In an embodiment, the counter may include an atomic counter. Further still, in a sixth operation, an average contribution of the light transport path is calculated, utilizing the counter as shown in operation 114. In an embodiment, calculating the average contribution may include accumulating the contributions of all light transport paths having the first hash. In another embodiment, calculating the average contribution may include scaling the accumulated contributions. For example, scaling the accumulated contributions may include dividing the accumulated contributions by a value of the counter.

Further still, in an embodiment, the selected vertex may be jittered before quantizing one or more features of the selected vertex. For example, the jittering may be performed according to a selected distribution. In another example, the jittering may be performed in a tangent plane of a surface on which the vertex is located. In another example, the selected vertex may be stored with a plurality of additional vertices in a volume, and the vertices stored in the volume may be jittered.

Also, in an embodiment, quantizing the one or more features of the selected vertex may be performed uniformly. In another embodiment, quantizing the one or more features of the selected vertex may be performed according to a distance of the selected vertex from the camera. In yet another embodiment, quantizing the one or more features of the selected vertex may be performed according to a length of a path segment (e.g., a path from the light source or from the camera/eye, etc.). In still another embodiment, quantizing the one or more features of the selected vertex may be performed according to a heuristic based on a distribution and a local density of a plurality of vertices.

Additionally, in an embodiment, performing collision resolution within the hash table may include detecting one or more collisions by comparing the one or more quantized features of the selected vertex with one or more quantized features of additional vertices. In another embodiment, performing collision resolution within the hash table may include detecting one or more collisions by quantizing a second set of features of the selected vertex, calculating a second hash based on the second set of quantized features, and comparing the second hash of the selected vertex with one or more second hashes of additional vertices.

Further, in an embodiment, one or more accumulated contributions and zero or more counters may be looked up for vertices of paths within a scene during a simulation. In another embodiment, the quantizing of the one or more features of the selected vertex may be locally determined. For example, a local quantization resolution may be determined by checking the mutual visibility of selected vertices of different light transport paths within a scene.

Further still, in an embodiment, one or more features of the selected vertex may be excluded during the calculation of the first hash. In another embodiment, the excluded features may be included in a calculation of a second hash. In yet another embodiment, an additional search may be enabled by performing collision resolution.

Also, in an embodiment, an exponential moving average may be implemented in order to accumulate contributions for the light transport path over time. For example, a sum of contributions of all light transport paths having the first hash, as well as the counter, may be kept over a period of time, and may be combined with an average contribution of the light transport paths for a current time period.

In addition, in an embodiment, a predetermined parameter of an exponential moving average may be set, such that the exponential moving average becomes a cumulative moving average. In another embodiment, the predetermined parameter may be selected based on results of a path tracing simulation. In yet another embodiment, the predetermined parameter may be selected based on an evaluation of additional light transport paths. In still another embodiment, the exponential moving average may be controlled based on information from the path tracing simulation.

Furthermore, in an embodiment, an additional filter may be used to filter noise resulting from jittering. For example, the additional filter may operate in a temporal domain. In another example, the additional filter may use an exponential moving average. In yet another example, a parameter of the exponential moving average may be set so that the exponential moving average becomes a cumulative moving average. In still another embodiment, the exponential moving average may be controlled based on information from the path tracing simulation.

Further still, in an embodiment, the vertex may be selected from a path from a light source. Additionally, one or more additional vertices may be selected from a path from an eye/camera location. Further, scaling may be performed by an according area measure as part of a photon mapping operation.

In this way, proximate vertices may be clustered by quantizing descriptors for light transport path vertices. Additionally, contributions of vertices may be accumulated by hashing quantized descriptors in a hash table. Further, the hash table may be utilized to perform path space filtering (instead of performing a general search for proximate vertices). Further still, discretization artifacts resulting from the quantization of the descriptors may be resolved by jittering vertices. Also, the hash table and the accumulated contributions may be utilized to perform photon mapping.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
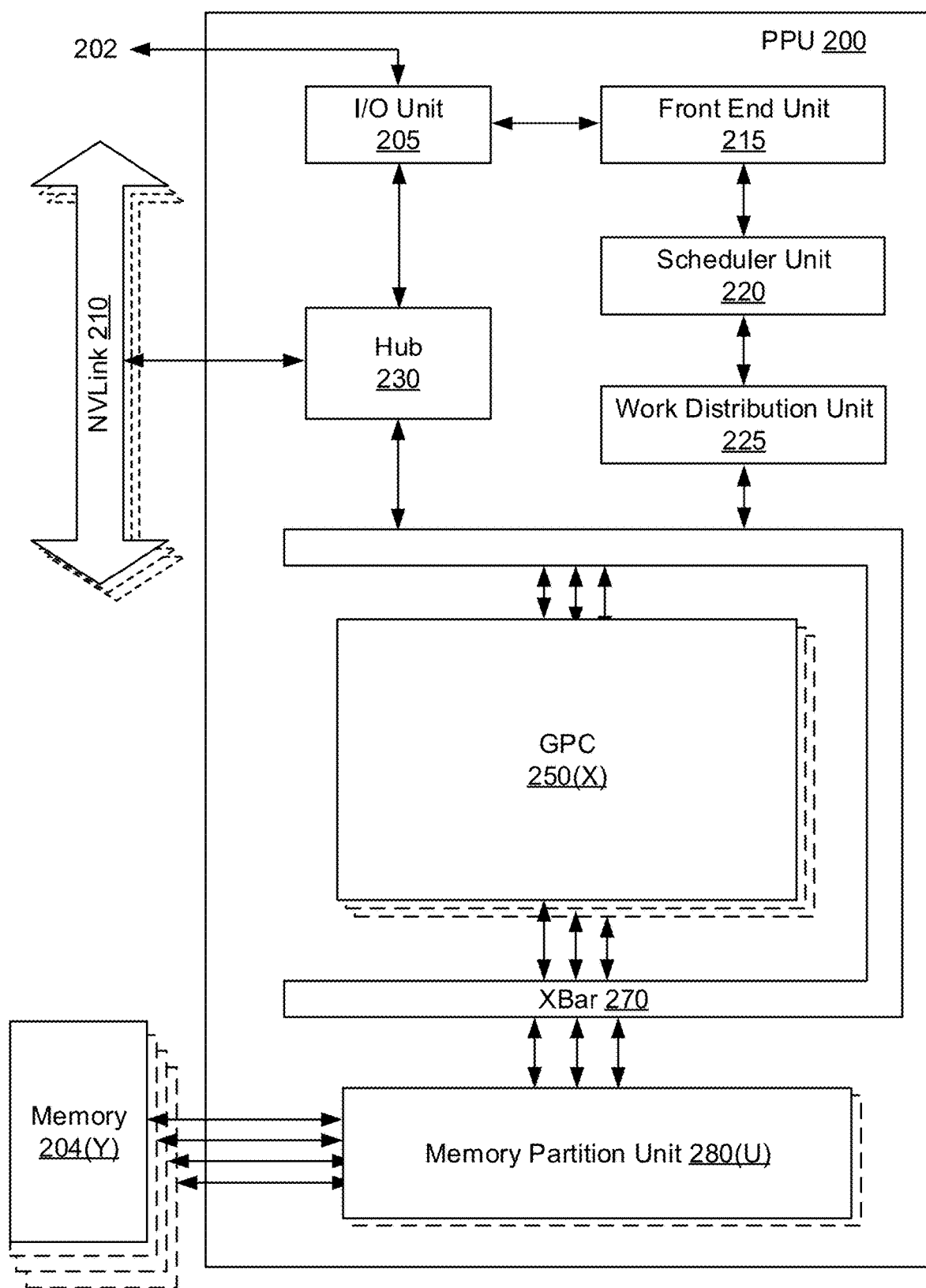
FIG. 2 illustrates a parallel processing unit, in accordance with an embodiment.

FIG. 2 illustrates a parallel processing unit (PPU) 200, in accordance with an embodiment. In an embodiment, the PPU 200 is a multi-threaded processor that is implemented on one or more integrated circuit devices. In an embodiment, the PPU 200 or parts of it may be implemented on reconfigurable logic devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
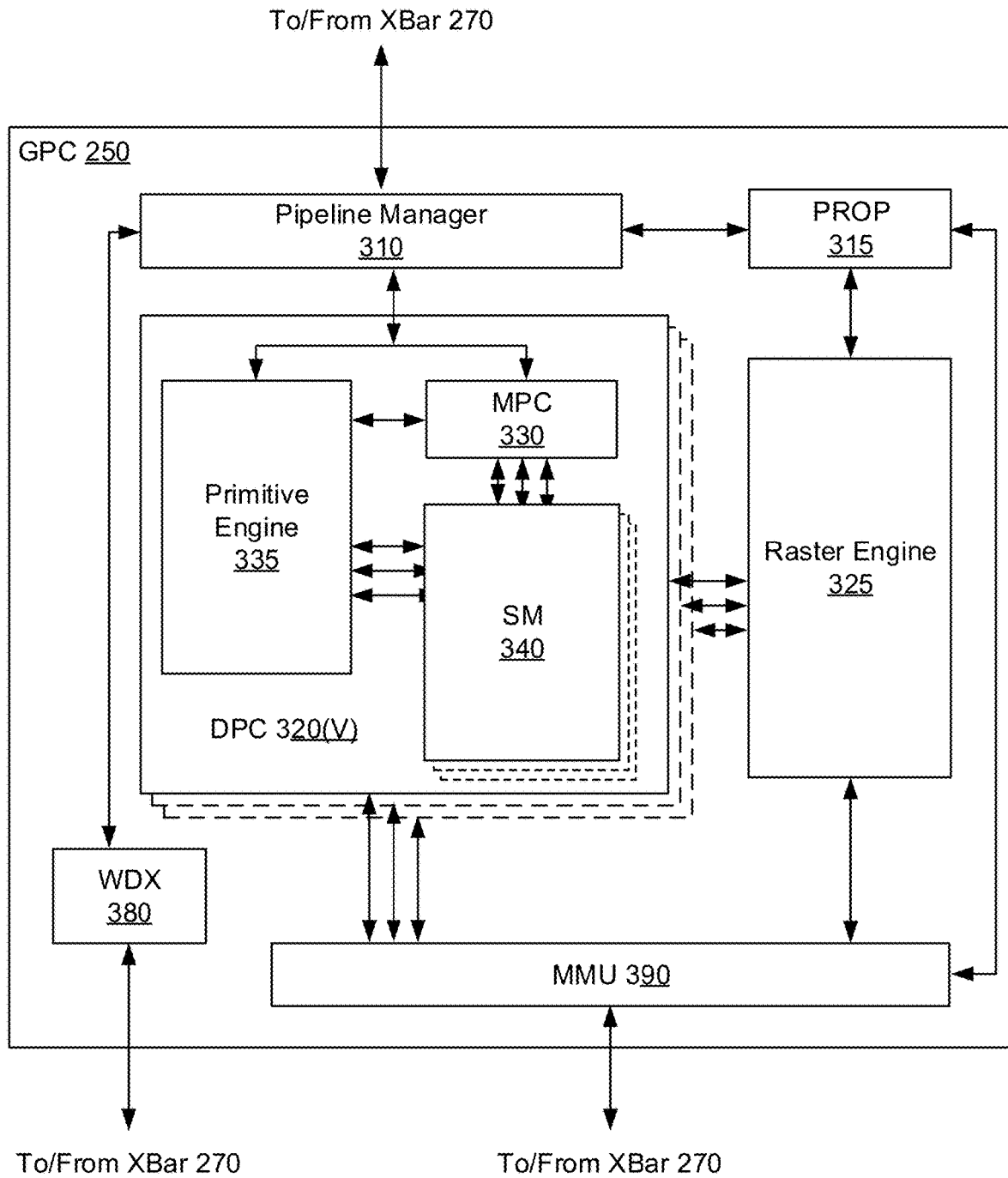
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
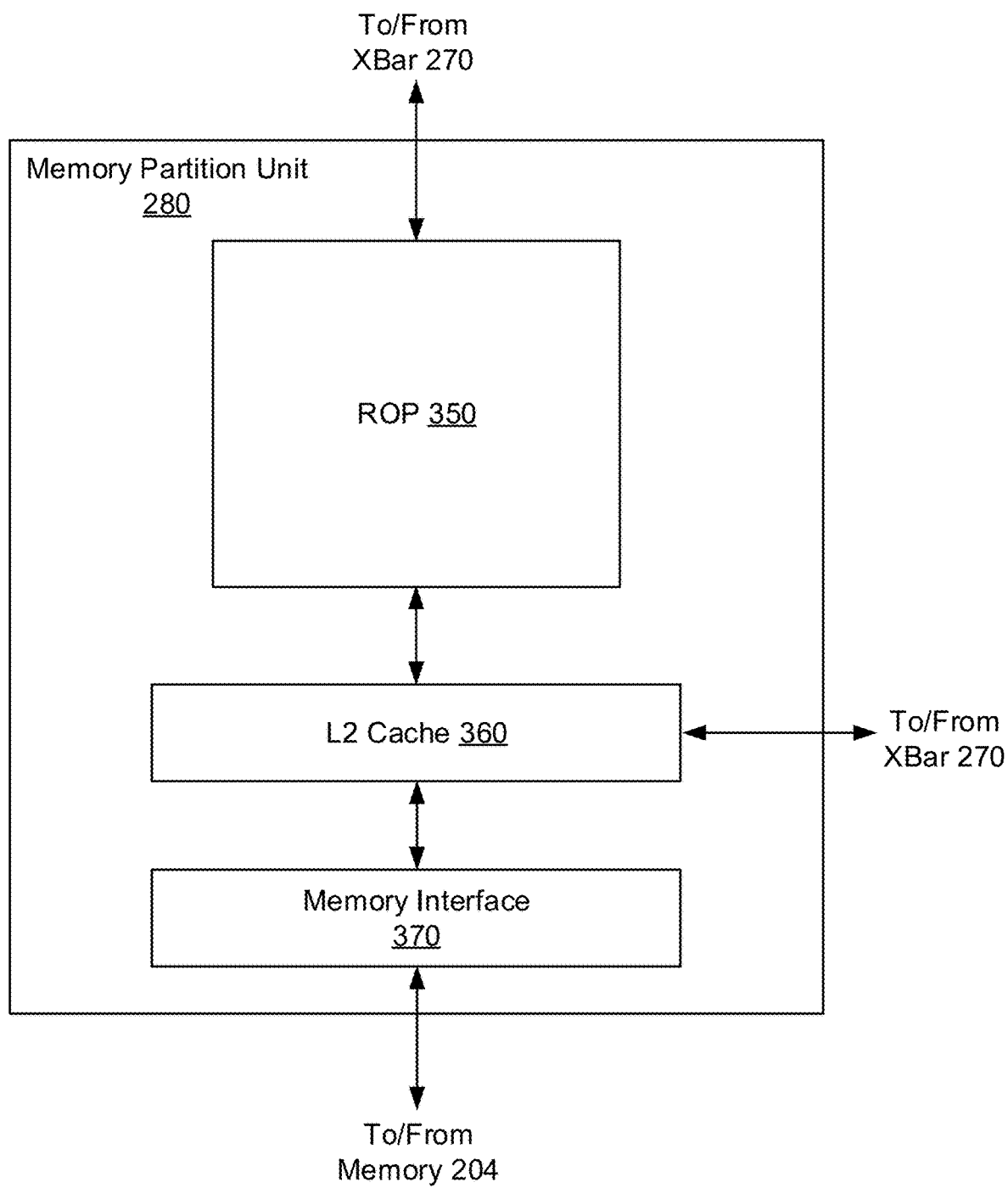
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLBs) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiment, the ROP unit 350 may be outside of the memory partition unit 280. For example, the ROP unit 350 may reside in the GPC 250 or another unit.

Figure 4A:
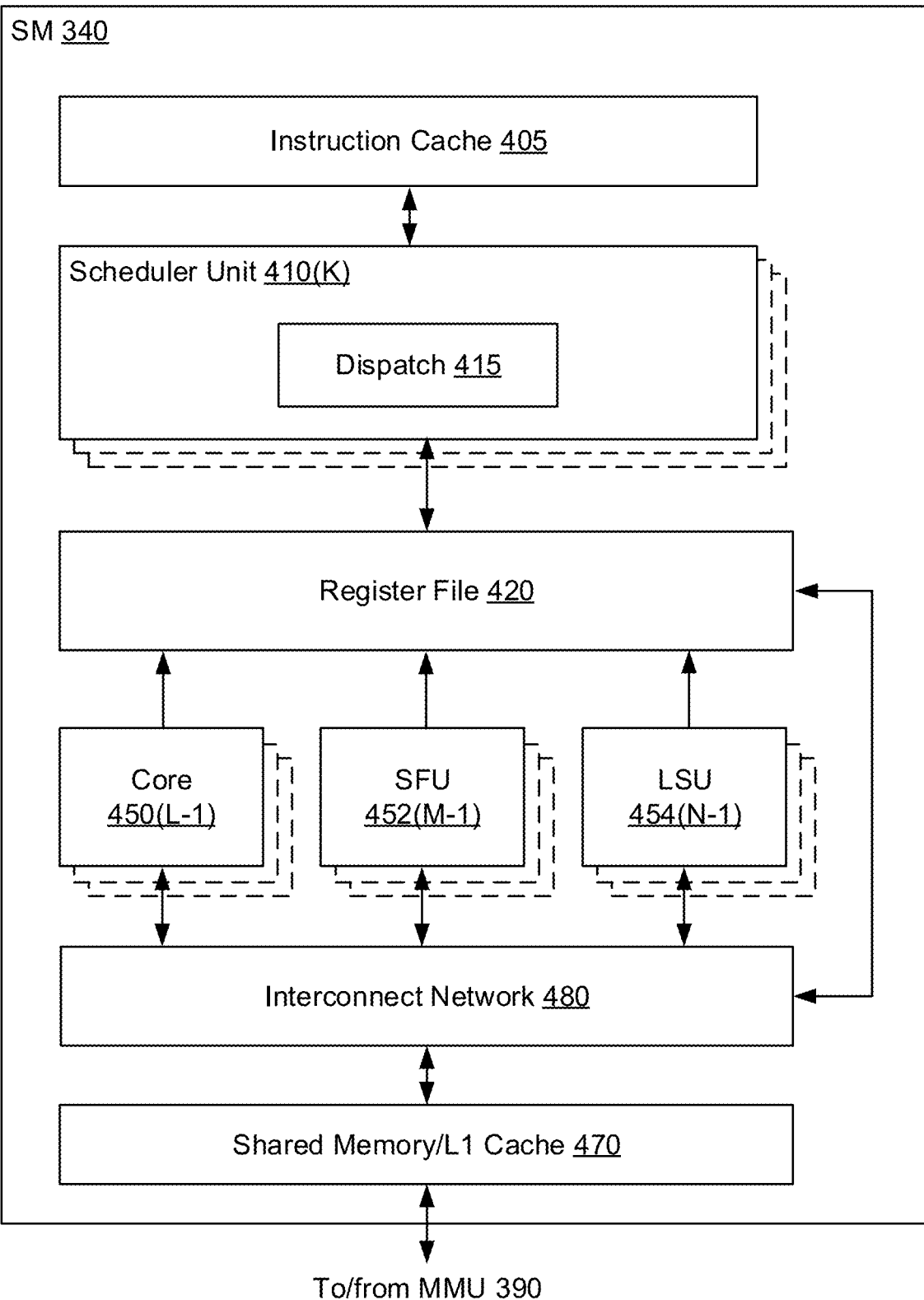
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
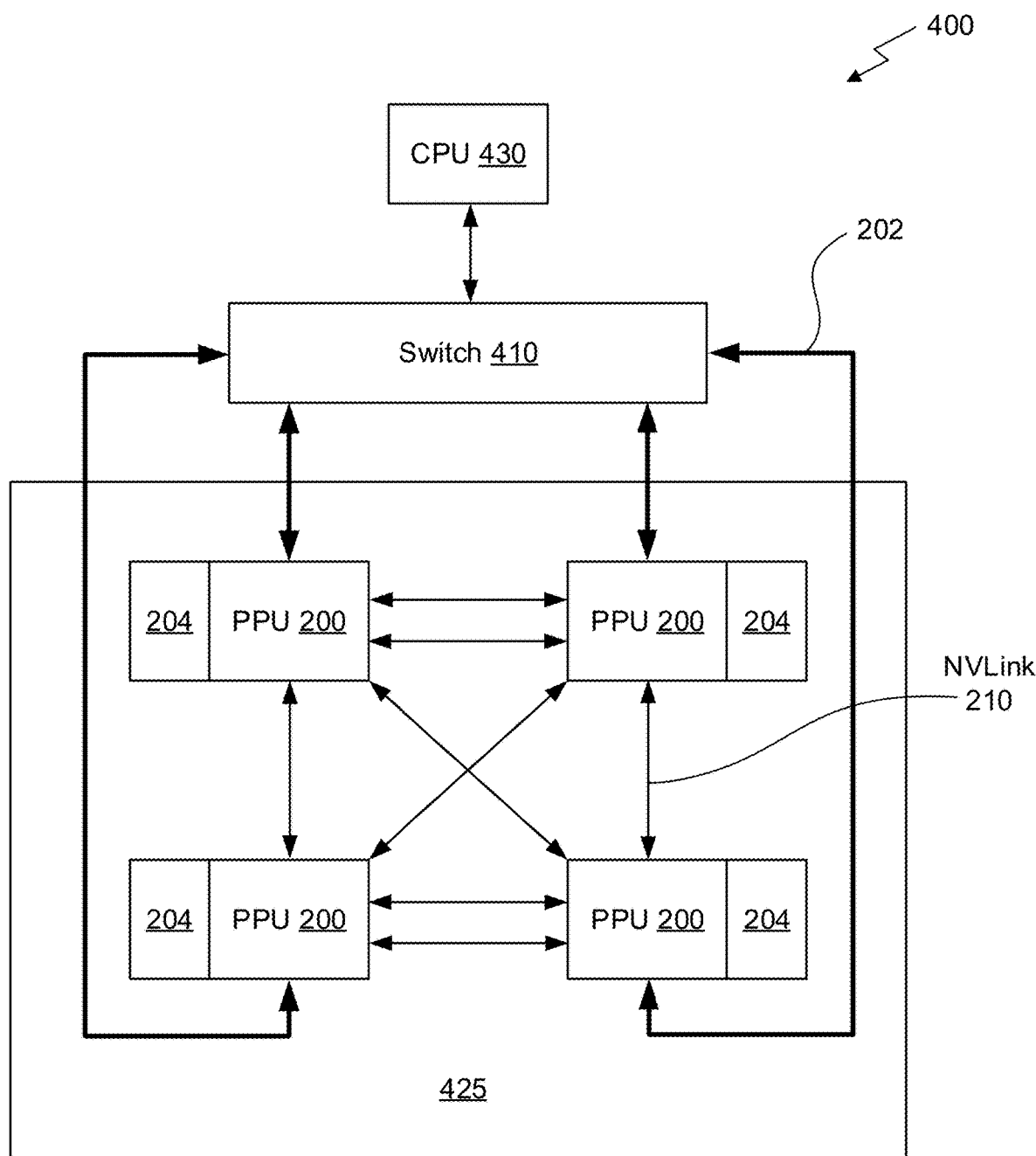
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
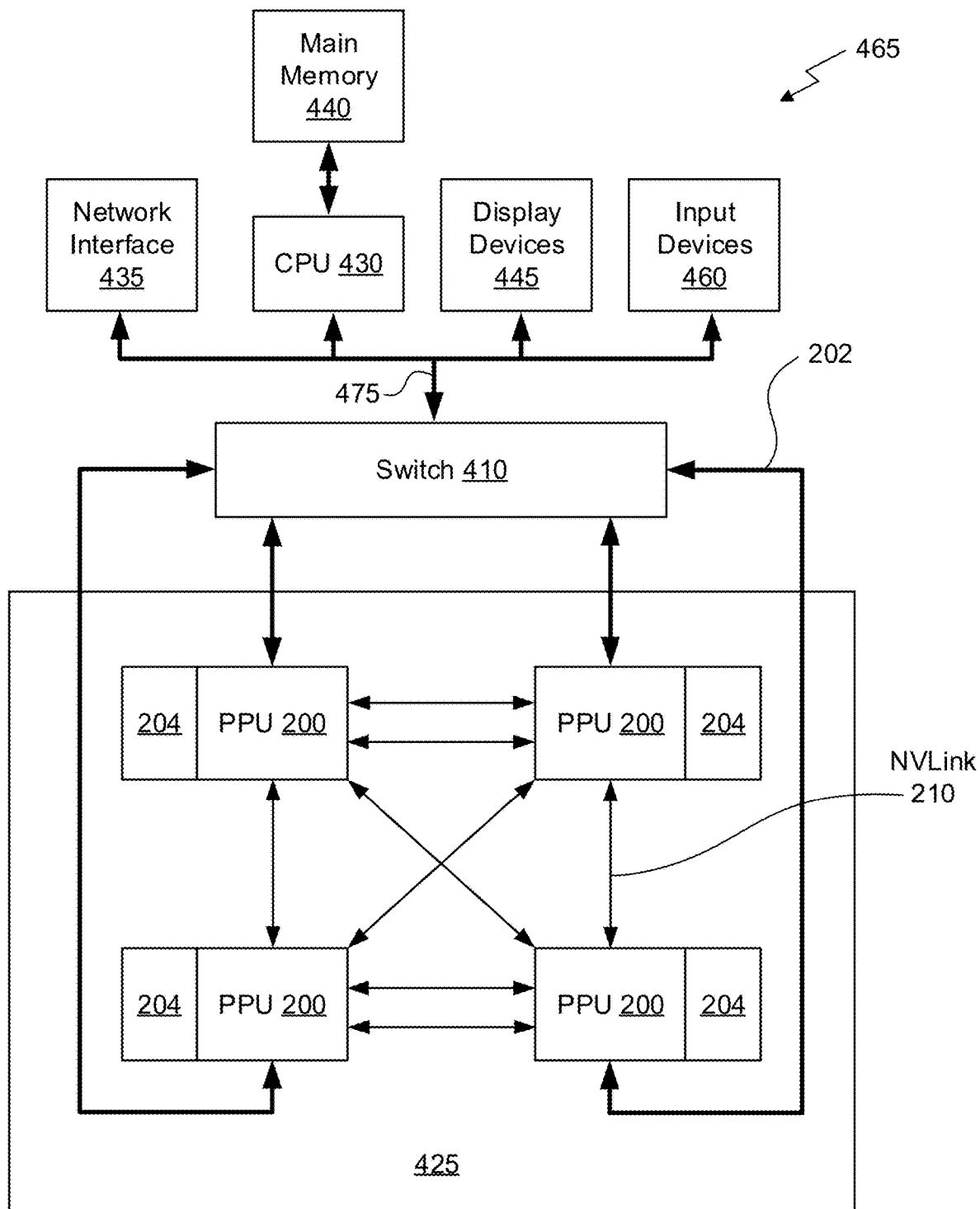
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like.

Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In an embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 5:
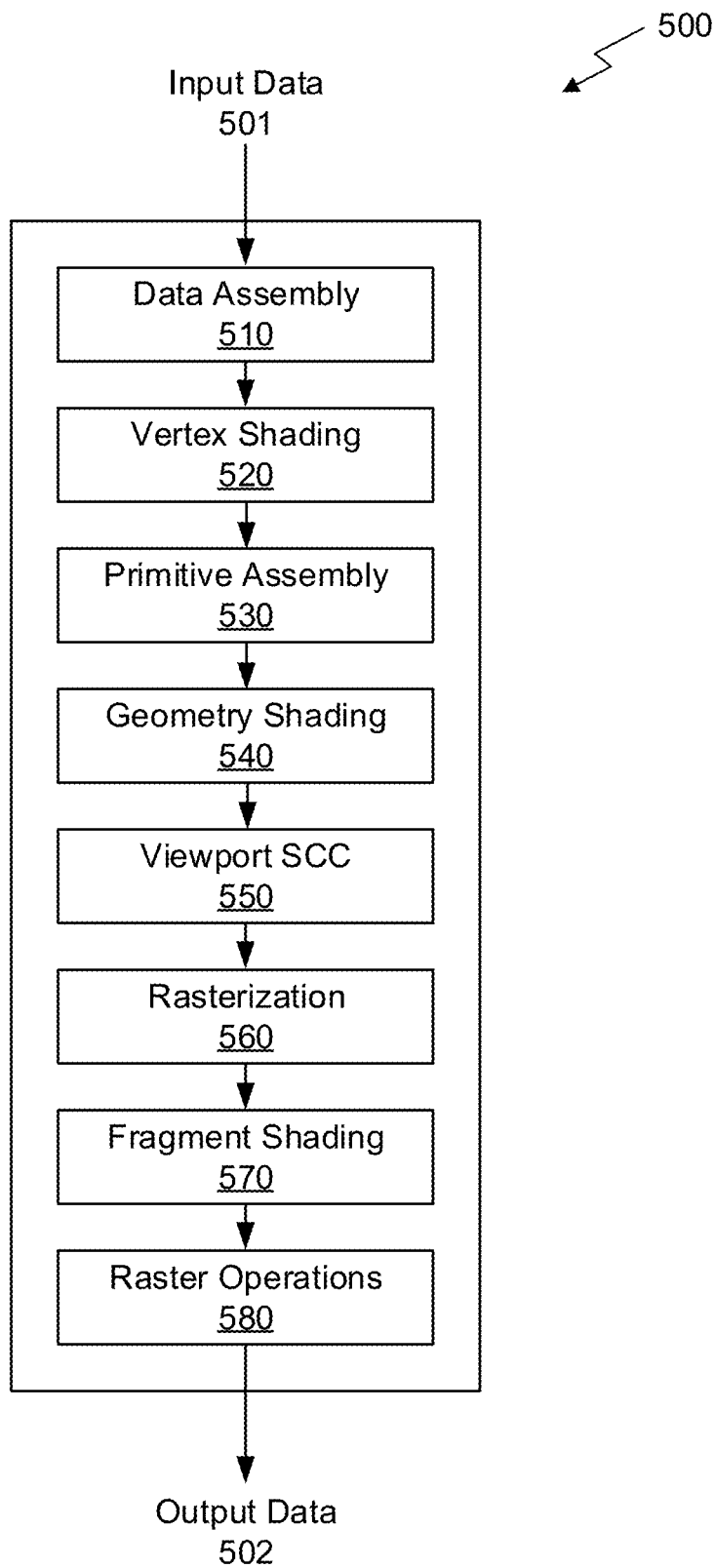
FIG. 5 is a conceptual diagram of a graphics processing pipeline implemented by the PPU of FIG. 2, in accordance with an embodiment.

FIG. 5 is a conceptual diagram of a graphics processing pipeline 500 implemented by the PPU 200 of FIG. 2, in accordance with an embodiment. The graphics processing pipeline 500 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 500 receives input data 501 that is transmitted from one stage to the next stage of the graphics processing pipeline 500 to generate output data 502. In an embodiment, the graphics processing pipeline 500 may represent a graphics processing pipeline defined by the OpenGL® API. As an option, the graphics processing pipeline 500 may be implemented in the context of the functionality and architecture of the previous Figures and/or any subsequent Figure(s).

As shown in FIG. 5, the graphics processing pipeline 500 comprises a pipeline architecture that includes a number of stages. The stages include, but are not limited to, a data assembly stage 510, a vertex shading stage 520, a primitive assembly stage 530, a geometry shading stage 540, a viewport scale, cull, and clip (VSCC) stage 550, a rasterization stage 560, a fragment shading stage 570, and a raster operations stage 580. In an embodiment, the input data 501 comprises commands that configure the processing units to implement the stages of the graphics processing pipeline 500 and geometric primitives (e.g., points, lines, triangles, quads, triangle strips or fans, etc.) to be processed by the stages. The output data 502 may comprise pixel data (i.e., color data) that is copied into a frame buffer or other type of surface data structure in a memory.

The data assembly stage 510 receives the input data 501 that specifies vertex data for high-order surfaces, primitives, or the like. The data assembly stage 510 collects the vertex data in a temporary storage or queue, such as by receiving a command from the host processor that includes a pointer to a buffer in memory and reading the vertex data from the buffer. The vertex data is then transmitted to the vertex shading stage 520 for processing.

The vertex shading stage 520 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 520 may manipulate individual vertex attributes such as position, color, texture coordinates, and the like. In other words, the vertex shading stage 520 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 520 generates transformed vertex data that is transmitted to the primitive assembly stage 530.

The primitive assembly stage 530 collects vertices output by the vertex shading stage 520 and groups the vertices into geometric primitives for processing by the geometry shading stage 540. For example, the primitive assembly stage 530 may be configured to group every three consecutive vertices as a geometric primitive (i.e., a triangle) for transmission to the geometry shading stage 540. In some embodiments, specific vertices may be reused for consecutive geometric primitives (e.g., two consecutive triangles in a triangle strip may share two vertices). The primitive assembly stage 530 transmits geometric primitives (i.e., a collection of associated vertices) to the geometry shading stage 540.

The geometry shading stage 540 processes geometric primitives by performing a set of operations (i.e., a geometry shader or program) on the geometric primitives. Tessellation operations may generate one or more geometric primitives from each geometric primitive. In other words, the geometry shading stage 540 may subdivide each geometric primitive into a finer mesh of two or more geometric primitives for processing by the rest of the graphics processing pipeline 500. The geometry shading stage 540 transmits geometric primitives to the viewport SCC stage 550.

In an embodiment, the graphics processing pipeline 500 may operate within a streaming multiprocessor and the vertex shading stage 520, the primitive assembly stage 530, the geometry shading stage 540, the fragment shading stage 570, and/or hardware/software associated therewith, may sequentially perform processing operations. Once the sequential processing operations are complete, in an embodiment, the viewport SCC stage 550 may utilize the data. In an embodiment, primitive data processed by one or more of the stages in the graphics processing pipeline 500 may be written to a cache (e.g. L1 cache, a vertex cache, etc.). In this case, in an embodiment, the viewport SCC stage 550 may access the data in the cache. In an embodiment, the viewport SCC stage 550 and the rasterization stage 560 are implemented as fixed function circuitry.

The viewport SCC stage 550 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 560.

The rasterization stage 560 converts the 3D geometric primitives into 2D fragments (e.g. capable of being utilized for display, etc.). The rasterization stage 560 may be configured to utilize the vertices of the geometric primitives to setup a set of plane equations from which various attributes can be interpolated. The rasterization stage 560 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 560 generates fragment data (i.e., interpolated vertex attributes associated with a particular sample location for each covered pixel) that are transmitted to the fragment shading stage 570.

The fragment shading stage 570 processes fragment data by performing a set of operations (i.e., a fragment shader or a program) on each of the fragments. The fragment shading stage 570 may generate pixel data (i.e., color values) for the fragment such as by performing lighting operations or sampling texture maps using interpolated texture coordinates for the fragment. The fragment shading stage 570 generates pixel data that is transmitted to the raster operations stage 580.

The raster operations stage 580 may perform various operations on the pixel data such as performing alpha tests, stencil tests, and blending the pixel data with other pixel data corresponding to other fragments associated with the pixel. When the raster operations stage 580 has finished processing the pixel data (i.e., the output data 502), the pixel data may be written to a render target such as a frame buffer, a color buffer, or the like.

It will be appreciated that one or more additional stages may be included in the graphics processing pipeline 500 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 540). Other types of graphics processing pipelines are contemplated as being within the scope of the present disclosure. Furthermore, any of the stages of the graphics processing pipeline 500 may be implemented by one or more dedicated hardware units within a graphics processor such as PPU 200. Other stages of the graphics processing pipeline 500 may be implemented by programmable hardware units such as the SM 340 of the PPU 200.

The graphics processing pipeline 500 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU. In other instances, the device driver may perform operations, at least in part, by launching operations on the PPU 200 utilizing an input/output interface between the CPU and the PPU 200. In an embodiment, the device driver is configured to implement the graphics processing pipeline 500 utilizing the hardware of the PPU 200.

Various programs may be executed within the PPU 200 in order to implement the various stages of the graphics processing pipeline 500. For example, the device driver may launch a kernel on the PPU 200 to perform the vertex shading stage 520 on one SM 340 (or multiple SMs 340). The device driver (or the initial kernel executed by the PPU 300) may also launch other kernels on the PPU 300 to perform other stages of the graphics processing pipeline 500, such as the geometry shading stage 540 and the fragment shading stage 570. In addition, some of the stages of the graphics processing pipeline 500 may be implemented on fixed unit hardware such as a rasterizer or a data assembler implemented within the PPU 300. It will be appreciated that results from one kernel may be processed by one or more intervening fixed function hardware units before being processed by a subsequent kernel on an SM 340.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Massively Parallel Path Space Filtering

While searching proximate vertices had been more expensive than filtering in screen space, we greatly improve over this performance penalty by storing and looking up the required information in a hash table. The keys are constructed from jittered and quantized information, such that only a single query very likely replaces costly neighborhood searches. A massively parallel implementation of the algorithm is demonstrated on a GPU.

Introduction

Realistic image synthesis consists of high-dimensional numerical integration of functions with potentially high variance. Restricting the number of samples therefore often results in visible noise, which efficiently can be reduced by path space filtering.

We improve the performance of path space filtering by replacing costly neighborhood search with averages of clusters resulting from quantization. Our new algorithm is suitable for interactive and even real-time rendering and it enables many applications trading a controllable bias for a dramatic speedup and noise reduction.

Algorithm

The new scheme may include three steps: After a set of light transport paths has been generated, for example by a path tracer, a key is constructed for each one selected vertex of each path. This key incorporates all information required to cluster proximate vertices: All contributions with identical hashes are atomically added. The number of contributions per hash is maintained by an atomic counter, too, and used to finally compute the average contribution. For each path its associated average is multiplied by its throughput and accumulated in its respective pixel. The throughput is the attenuation from the camera along the light transport path up to the selected vertex, for example, the first sufficiently diffuse vertex.

Figure 6A:
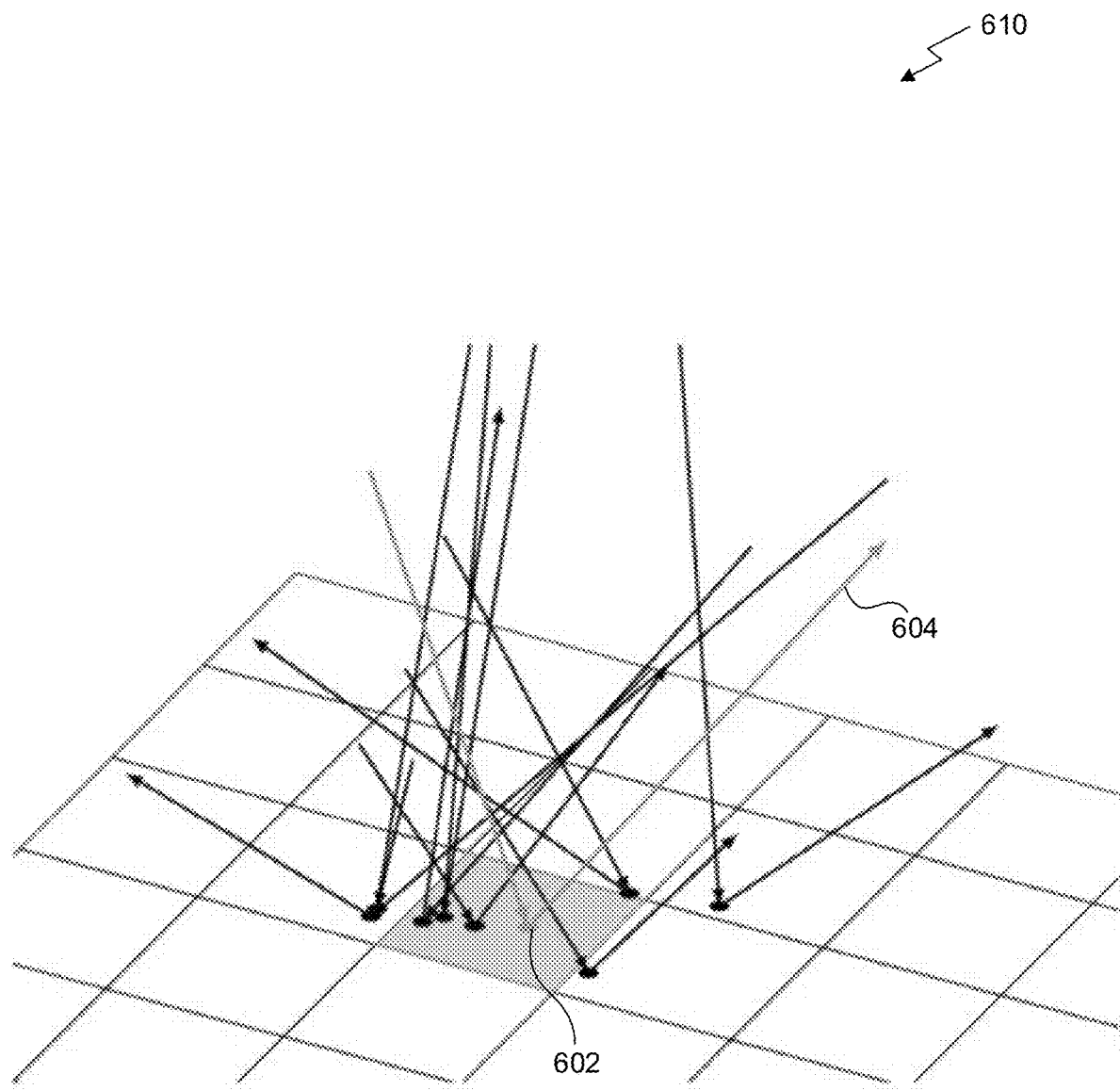
FIG. 6A illustrates a first step for performing parallel path space filtering by hashing, in accordance with an embodiment.
Figure 6B:
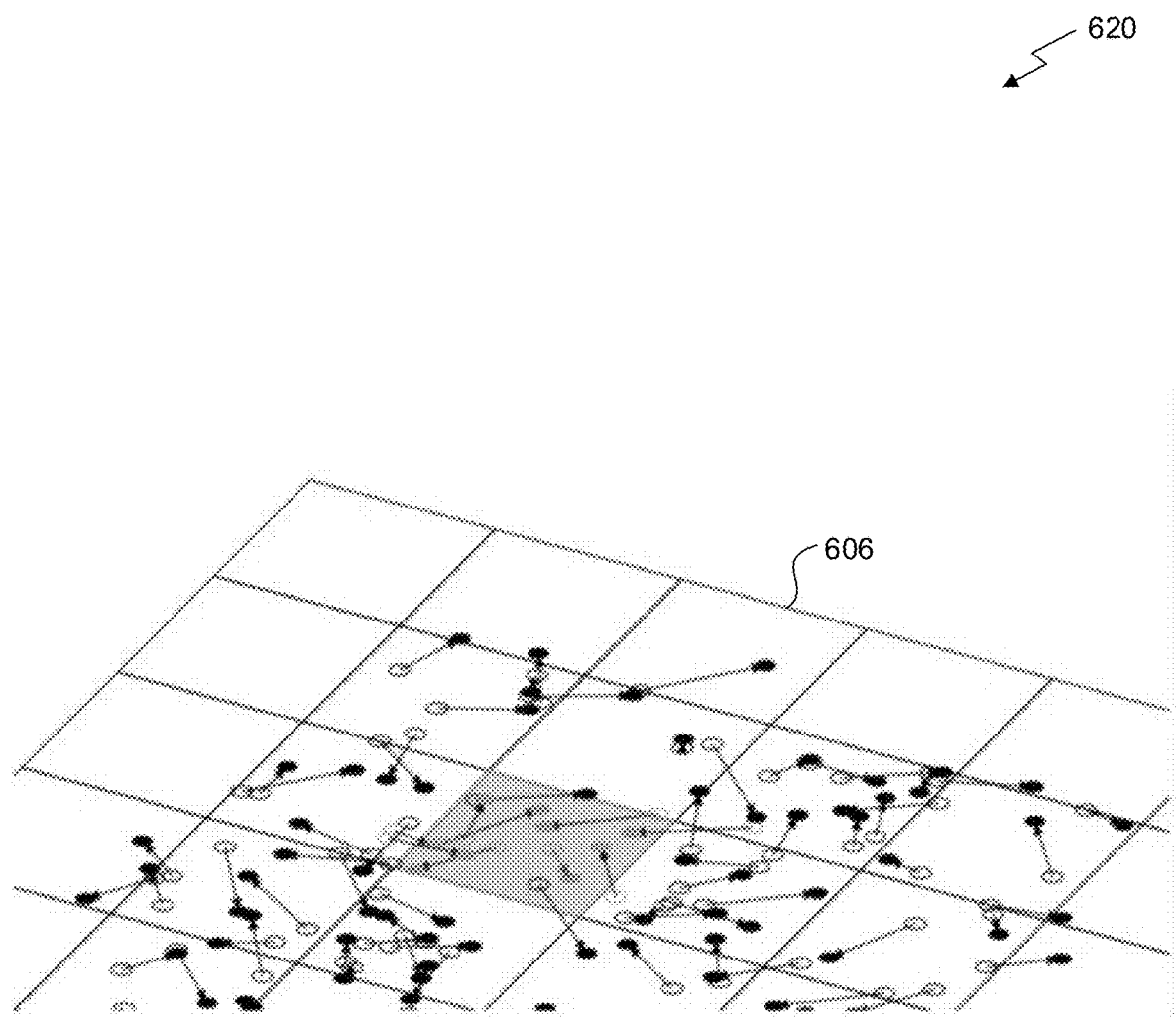
FIG. 6B illustrates a second step for performing parallel path space filtering by hashing, where the jittered vertices are shown, in accordance with an embodiment.
Figure 6C:
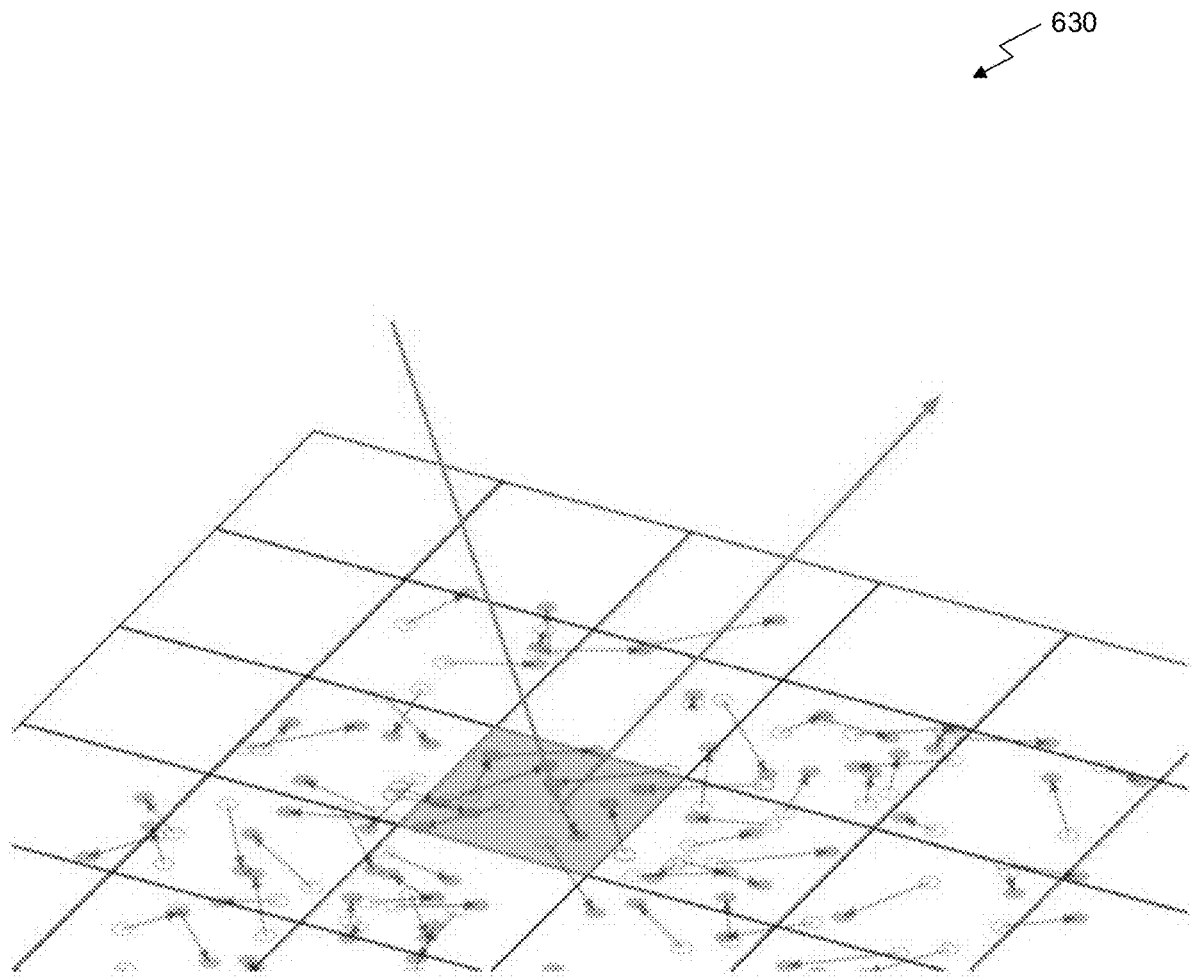
FIG. 6C illustrates a third step for performing parallel path space filtering by hashing, where all contributions with their hash identical to the hash of the vertex of interest are averaged, in accordance with an embodiment.

FIG. 6A illustrates a first step 610 for performing parallel path space filtering by hashing, in accordance with an embodiment. As shown in FIG. 6A, in order to determine the filtered contribution for an exemplary vertex 602 along a path segment 604, all selected vertices are jittered by vectors sampled proportional to a filter kernel density. FIG. 6B illustrates a second step 620 for performing parallel path space filtering by hashing, where the jittered vertices are shown. The displaced vertices may be quantized according to the underlying grid 606. FIG. 6C illustrates a third step 630 for performing parallel path space filtering by hashing, where all contributions with their hash identical to the hash of the vertex of interest are averaged. In an embodiment, the grid may not be aligned to the plane of jittering directions.

Hashing Quantized Descriptors

Other than neighborhood search, hashing allows for sorting and searching in linear time. We therefore apply a fast hash function to a key, which is the descriptor of a path, and accumulate the contributions of all light transport paths with identical hashes.

Figure 7:
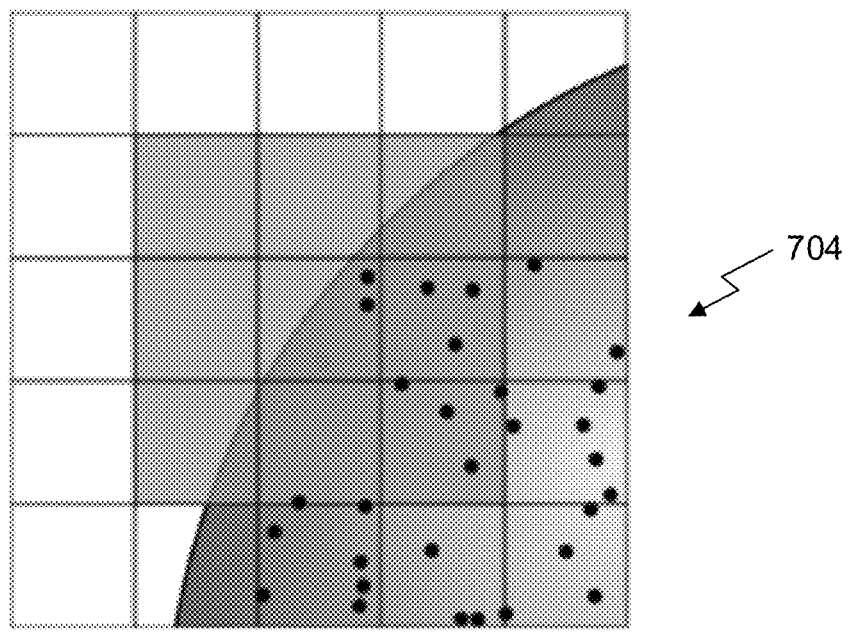
FIG. 7 illustrates results of accumulating the contributions of all light transport paths with identical hashes, in accordance with an embodiment.
Figure 7:
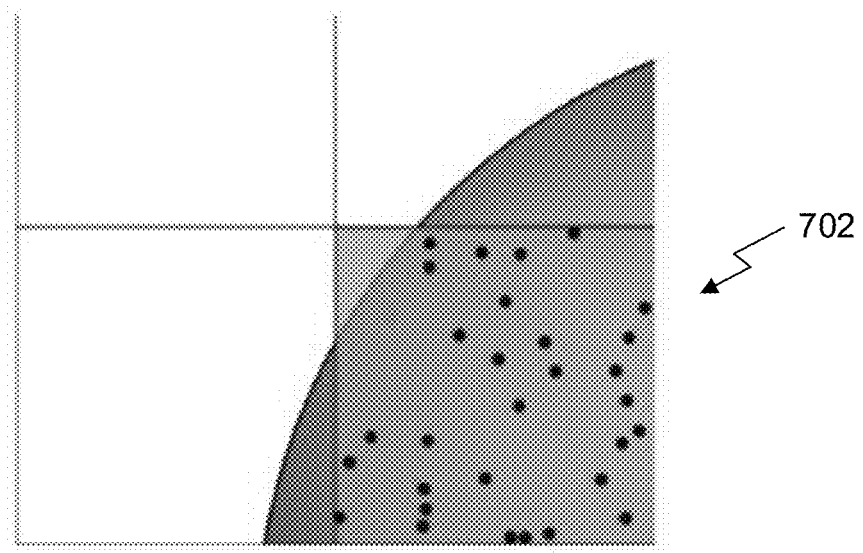

FIG. 7 illustrates results 702 of accumulating the contributions of all light transport paths with identical hashes, according to one exemplary embodiment. As shown in FIG. 7, instead of searching an $n^3$ neighborhood 704, the clustering resulting from quantization is used to accumulate contributions, which allows for a single look up.

Table 1 includes an exemplary algorithm for the computation of the two hashes used for a lookup, in accordance with an embodiment. Of course, it should be noted that the algorithm shown in Table 1 is set forth for illustrative purposes only, and thus should not be construed as limiting in any manner. Also, note that the arguments of a hash function, which form the descriptor, may be extended to refine clustering.

TABLE 1

Input: Location x of the vertex, the normal n, the position of the camera $p_{cam}$, and the scale s.
Output: Hash i to determine the position in the hash table and hash v for verification.
1 ← level_of_detail($|p_{cam} - x|$)
x' ← x + jitter(n) + s · $2^l$
l' ← level_of_detail($|p_{cam} - x'|$)

$\tilde{x} \leftarrow \left\lfloor \dfrac{x'}{s \cdot s^{l'}} \right\rfloor$ i ← hash($\tilde{x}$, ...)
v ← hash2($\tilde{x}$, n, ...)

A descriptor contains at least the quantized world space position of a selected vertex of a light transport path. As shown in Table 1, level of detail can efficiently be handled by the descriptor, too: A heuristic as simple as the distance d along the path is sufficient to select a level of detail for accumulation. Adding information about the normal in that location avoids blurring lighting across edges. Furthermore, the incoming direction for non-diffuse materials and the layer identifier for layered materials may be included in the descriptor.

Instead of storing and comparing the rather long descriptors for hash verification, we apply a second, different hash function to the same descriptor and accumulate a contribution only if the secondary hashes v match, see Table 1. In order to increase the occupancy in the hash table, linear probing with a very small number of steps may be employed when encountering a hash collision. Restricting linear probing to stay within one cache line, the collision resolution is almost negligible on modern architectures. Unless a hash collision can be resolved, we resort to the unfiltered original contribution of the path.

In addition, linear probing may be used to differentiate attributes of the light transport path at a finer level of detail: For example, normal information may be included in the descriptor handed to the verification hash function instead of already including it in the main descriptor. This allows one to search for similar normals by linear probing.

Figure 8:
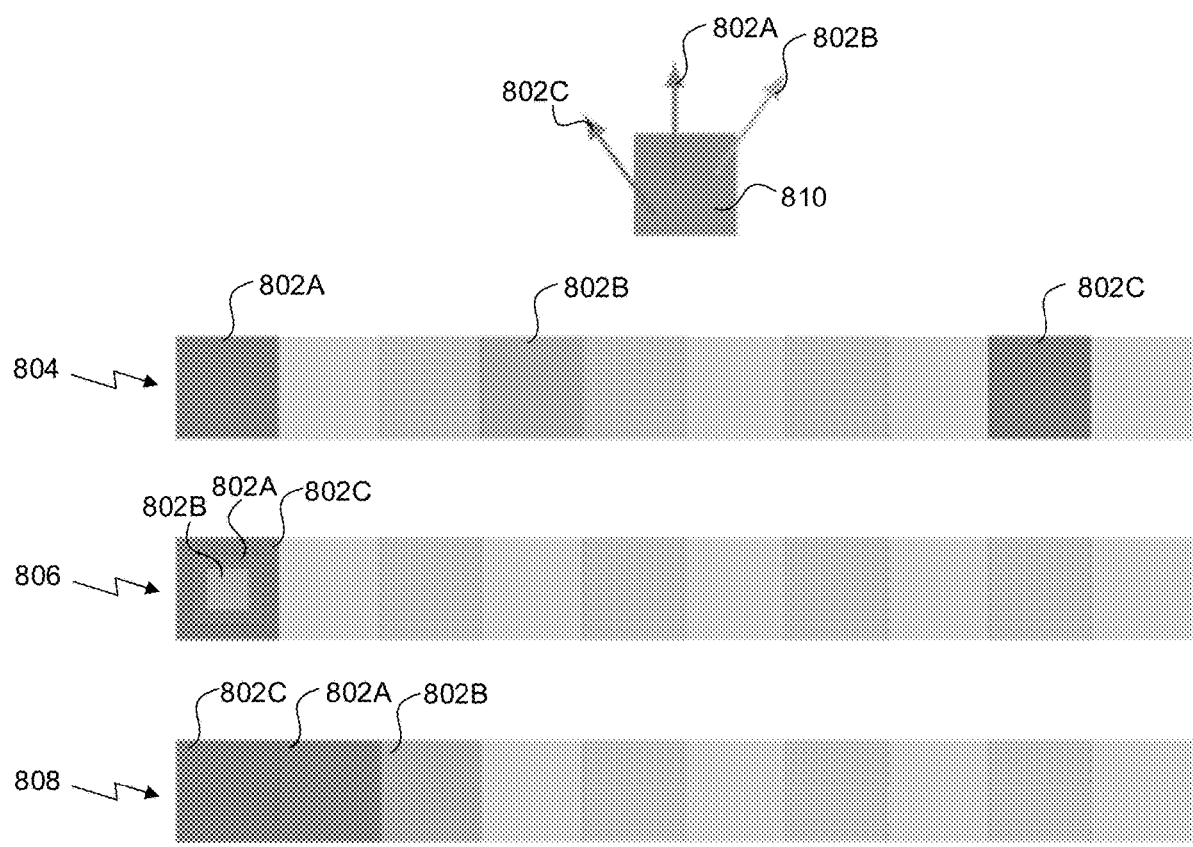
FIG. 8 illustrates the use of linear probing to differentiate attributes of a light transport path at a finer level of detail, in accordance with an embodiment.

FIG. 8 illustrates the use of linear probing to differentiate attributes of a light transport path at a finer level of detail, according to one exemplary embodiment. As shown in FIG. 8, instead of including normals 802A-C in the descriptor as illustrated in 804, to differentiate contributions whose vertices would fall into the same cluster as shown in 806, the verification hash function can be applied to a descriptor including normal information. This allows one to differentiate normal information by linear probing as shown in 808. For reference, FIG. 8 also includes an illustration of the normals 802A-C emerging from a voxel 810 resulting from the quantization.

Filter Kernel Approximation by Jittering

The discontinuities of quantization may be removed by jittering key parameters in the path descriptor, which in fact may amount to approximating a filter kernel by sampling. Jittering depends on the kind of descriptor parameter, for example, positions may be jittered in the tangent plane of an intersection, see Table 1. The resulting noise may be preferable over the visible discretization artifacts resulting from quantization. Other than discretization artifacts, noise from jitter is simple to filter.

Figure 9:
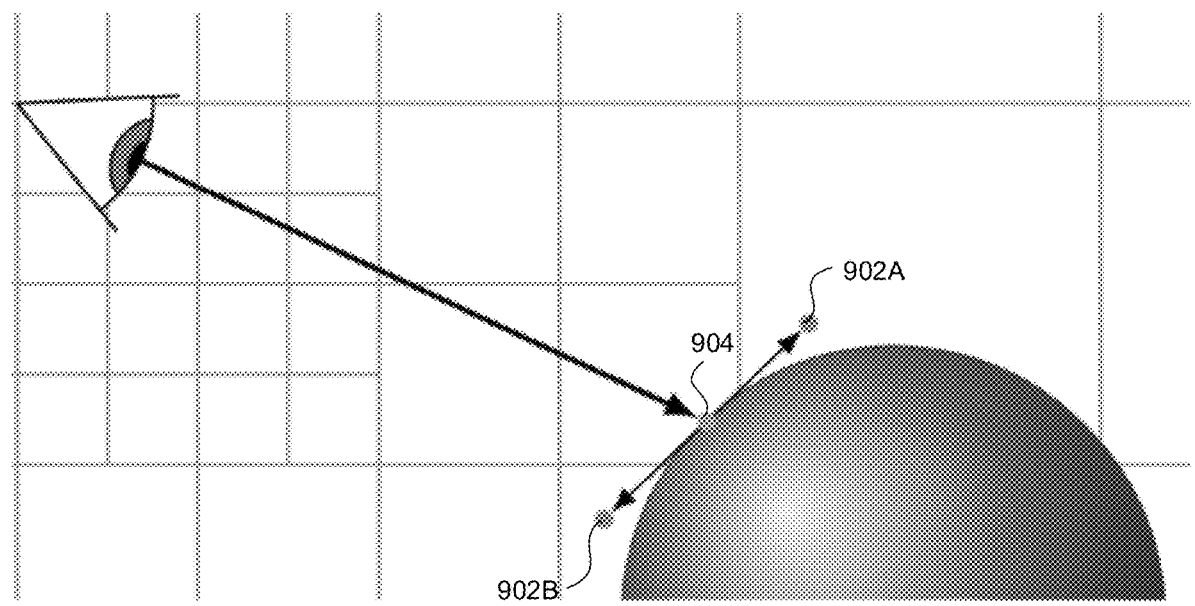
FIG. 9 illustrates that the level of detail of a jittered location may differ from the level of detail of an original location, in accordance with an embodiment.

FIG. 9 illustrates that the level of detail of a jittered location 902A-B may differ from the level of detail of an original location 904.

Accumulation Over Time

Accumulating contributions over time dramatically increases efficiency. For static scenes, the averages will converge. For dynamic environments, maintaining two sets of averaged contributions and combining them with an exponential moving average $c = \alpha \cdot c_{old} + (1-\alpha) \cdot c_{new}$ is a common tradeoff between convergence and temporal adaptivity. Big changes even for hashes with a large number of old contributions can be controlled by the parameter $\alpha$.

However, combining the averages $c_{old}$ and $c_{new}$ by an exponential average may not be equivalent to temporal integration. Especially averages of hashes with relatively few samples may not converge. In this case it may be beneficial to accumulate samples over time up to a certain degree. This may be implemented using a fixed threshold for the number of samples and accumulating samples over time until reaching it. In the same spirit, $\alpha$ may depend on the number of samples, again using an upper bound to guarantee temporal responsiveness.

Eviction Strategy

Evicting contributions of hashes which have not been queried for a certain period of time may be necessary for larger scenes and changing camera. Besides the least recently used (LRU) eviction strategy, heuristics based on longer term observations may be efficient.

A very simple implementation may rely on replacing the most significant bits of the verification hash by a priority composed of for example vertex density and last access time during temporal filtering. Thus, the pseudo-randomly hashed least significant bits guarantee missing contributions to be uniformly distributed across the scene, while the most significant bits ensure that contributions are evicted according to priority. This allows collision handling and eviction to be realized by a single atomicMin operation.

Due to camera movement or other parameters changing hashes over time, a small number of old contributions may not be found any more. While jittering may hide discontinuities due to these changes as well, it does not compensate for the significant loss in quality due to the reduced number of averaged samples. Therefore, an additional neighborhood search may be performed in these rare cases. A similar issue may appear for parts of the scene that do not have many other contributions with identical hashes.

Results and Discussion

While filtering contributions at primary intersections with the proposed algorithm is quite fast, it only removes some artifacts of filtering in screen space. However, hashed path space filtering has been designed to target real-time light transport simulation: It is the only efficient fallback when screen space filtering fails or is not available, for example, for specular or transparent objects. Filtering on non-diffuse surfaces requires the inclusion of additional parameters in the path descriptor and heuristics such as increasing the quantization resolution in areas with non-diffuse materials to minimize the visible artifacts.

In an embodiment, artifacts may be ameliorated by employing one or more heuristics. Filtering primary intersections doubles the performance due to the more coherent memory access patterns.

The image quality may be determined by the filter size, which balances noise versus blur. Both the number of collisions in the hash table, and hence the performance of filtering, may depend on the size of the voxels. For example, the voxel size may be specified by s-times the projected size of a pixel. Note that maximum performance may not necessarily coincide with best image quality. The hash table size may be chosen proportional to the number of pixels at target resolution such that potentially one vertex could be stored per pixel.

Instead of selecting the first sufficiently diffuse vertex along a path from the camera, path space filtering may be applied at any vertex. For example, filtering at the second sufficiently diffuse vertex may resemble final gathering or local passes. In fact, path space filtering may trade variance reduction for controlled bias and is orthogonal to other filtering techniques. Temporal antialiasing and complimentary noise filters in screen space may further reduce noise. A local smoothing filter may help reduce the error in the approximation.

Conclusion

Relying on only a few synchronizations during accumulation, path space filtering may be based on hashing scales on massively parallel hardware. Queries may be run in constant time and neither the traversal nor the construction of a hierarchical spatial acceleration data structure may be required. Hence the algorithm may be limited only by the performance of ray tracing.

The simplistic algorithm overcomes many restrictions of screen space filtering, does not require motion vectors, and enables noise removal beyond the first intersection including specular and transparent surfaces.

In an embodiment, important hashes may be excluded from eviction by reducing the level of detail, i.e. accumulating their contributions at a coarser level. The same would work for cells with only a few contributions. Other than selecting a level of detail by the length of the path, path differentials and variance may be used to determine the appropriate resolution.

This adaptive hashing scheme may be used for path space filtering, multi-view rendering, spectral rendering, participating media, decoupling anti-aliasing from shading, photon mapping, irradiance probes in reinforcement learned importance sampling, may be in combination with final gathering to store radiance probes, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   selecting a vertex of a light transport path;
   quantizing one or more features of the selected vertex;
   calculating a first hash based on the one or more quantized features of the selected vertex;
   performing a collision resolution within a hash table;
   accumulating a contribution of the light transport path at the selected vertex to the hash table;
   incrementing a counter in response to adding the contribution of the light transport path at the selected vertex to the hash table; and
   calculating an average contribution of the light transport path, utilizing the counter and the hash table.

2. The method of claim 1, wherein the selected vertex is jittered before quantizing one or more features of the selected vertex, and the jittering is performed according to a selected distribution.

3. The method of claim 2, wherein the jittering is performed in a tangent plane of a surface on which the vertex is located.

4. The method of claim 1, wherein the selected vertex is stored with a plurality of additional vertices in a volume, and all vertices stored in the volume may be jittered.

5. The method of claim 1, wherein:
   quantizing the one or more features of the selected vertex is performed uniformly,
   quantizing the one or more features of the selected vertex is performed according to a distance of the selected vertex from a camera,
   quantizing the one or more features of the selected vertex is performed according to a length of a path segment, or
   quantizing the one or more features of the selected vertex is performed according to a heuristic based on a distribution and a local density of a plurality of vertices.

6. The method of claim 1, wherein performing collision resolution within the hash table includes:

detecting one or more collisions by comparing the one or more quantized features of the selected vertex with one or more quantized features of additional vertices, or detecting one or more collisions by quantizing a second set of features of the selected vertex, calculating a second hash based on the second set of quantized features, and comparing the second hash of the selected vertex with one or more second hashes of additional vertices.

7. The method of claim 1, wherein one or more accumulated contributions and zero or more counters are looked up for vertices of paths within a scene during a simulation.

8. The method of claim 1, wherein:
the quantizing of the one or more features of the selected vertex is locally determined, and
a local quantization resolution is determined by checking the mutual visibility of selected vertices of different light transport paths within a scene.

9. The method of claim 1, wherein:
one or more features of the selected vertex are excluded during the calculation of the first hash,
the excluded features are included in a calculation of a second hash, and
an additional search is enabled by performing collision resolution.

10. The method of claim 1, wherein an exponential moving average is implemented in order to accumulate contributions for the light transport path over time, where:
a sum of contributions of all light transport paths having the first hash, as well as the counter, are kept over a period of time, and are combined with an average contribution of the light transport path for a current time period.

11. The method of claim 1, wherein a predetermined parameter of an exponential moving average is set, such that the exponential moving average becomes a cumulative moving average.

12. The method of claim 11, wherein the predetermined parameter is selected based on:
results of a path tracing simulation, or
an evaluation of additional light transport paths.

13. The method of claim 12, wherein the exponential moving average is controlled based on information from the path tracing simulation.

14. The method of claim 1, wherein an additional filter is used to filter noise resulting from jittering.

15. The method of claim 14, wherein:
the additional filter operates in a temporal domain, and
the additional filter uses an exponential moving average.

16. The method of claim 15, wherein a parameter of the exponential moving average is set so that the exponential moving average becomes a cumulative moving average.

17. The method of claim 15, wherein the exponential moving average is controlled based on information from a path tracing simulation.

18. The method of claim 1, wherein:
the vertex is selected from a path from a light source,
additional vertices are selected from a path from a camera/eye location, and
scaling is performed by an according area measure as part of a photon mapping operation.

19. The method of claim 1, wherein:
the collision resolution is performed within the hash table using the first hash such that the contribution of the light transport path at the selected vertex is accumulated with one or more additional contributions of one or more additional light transports paths at one or more additional vertices also having the first hash,
a number of contributions accumulated with respect to the first hash is maintained by the counter, and
the average contribution of the light transport path is calculated utilizing the counter and the contributions accumulated with respect to the first hash.

20. The method of claim 19, wherein the contributions are accumulated over a determined period of time.

21. The method of claim 19, wherein the contributions are accumulated at a selected level of detail.

22. A system comprising:
a processor that is configured to:
select a vertex of a light transport path;
quantize one or more features of the selected vertex;
calculate a first hash based on the one or more quantized features of the selected vertex;
perform a collision resolution within a hash table;
accumulate a contribution of the light transport path at the selected vertex to the hash table;
increment a counter in response to adding the contribution of the light transport path at the selected vertex to the hash table; and
calculate an average contribution of the light transport path, utilizing the counter and the hash table.

23. A computer-readable storage medium storing instructions that, when executed by a processor, causes the processor to perform steps comprising:
selecting a vertex of a light transport path;
quantizing one or more features of the selected vertex;
calculating a first hash based on the one or more quantized features of the selected vertex;
performing a collision resolution within a hash table;
accumulating a contribution of the light transport path at the selected vertex to the hash table;
incrementing a counter in response to adding the contribution of the light transport path at the selected vertex to the hash table; and
calculating an average contribution of the light transport path, utilizing the counter and the hash table.

* * * * *